United States Patent [19]

Itou et al.

[11] Patent Number: 5,288,830

[45] Date of Patent: Feb. 22, 1994

[54] CURABLE ORGANOPOLYSILOXANE COMPOSITION

[75] Inventors: Hideyuki Itou; Takamasa Toyoda, both of Annaka, Japan

[73] Assignee: Shin-Etsu Chemical Co., Ltd., Tokyo, Japan

[21] Appl. No.: 4,400

[22] Filed: Jan. 14, 1993

[30] Foreign Application Priority Data

Jan. 14, 1992 [JP] Japan .................................. 4-024809

[51] Int. Cl.$^5$ ............................................. C08G 77/12
[52] U.S. Cl. ........................................ 528/15; 528/31; 525/478
[58] Field of Search ................... 528/15, 31; 525/478

[56] References Cited

U.S. PATENT DOCUMENTS

| | | | |
|---|---|---|---|
| 4,340,709 | 7/1982 | Jeram et al. | 528/15 |
| 4,613,659 | 9/1986 | Lee et al. | 528/15 |

*Primary Examiner*—Melvyn I. Marquis
*Attorney, Agent, or Firm*—Lowe, Price, LeBlanc & Becker

[57] ABSTRACT

A curable organopolysiloxane composition which comprises an organopolysiloxane having at least two vinyl groups each joined to silicon atoms in the molecule and a defined viscosity, an organohydrogenpolysiloxane of a defined formula having at least two hydrogen atoms joined to silicon atom or atoms, and a catalytic amount of a platinum group catalyst is described. This composition has good curability and is capable of yielding a cured film which has good adhesion to plastic film or paper substrates.

9 Claims, No Drawings

CURABLE ORGANOPOLYSILOXANE COMPOSITION

BACKGROUND OF THE INVENTION

1. Field of the Invention

This invention relates to organopolysiloxane compositions and more particularly, to curable organopolysiloxane compositions whose curing speed is high and which are capable of yielding a cured silicone release composition having good adhesion to a variety of substrates. The invention also relates to a cured product of the composition.

2. Description of the Prior Art

For the purpose of preventing adhesion or cohesion between substrates such as paper sheets or plastic films and self-adhesive sheets, usual practice is to impart release properties to the surface of the substrate by formation of the film of a silicone composition on the substrate surface.

Several procedures of forming the silicone film on the substrate surface are known including:

(1) a method wherein a release film is formed by addition reaction of organopolysiloxanes having an aliphatic unsaturated bond or bonds and organohydrogenpolysiloxanes in the presence of platinum compounds; and (2) a method wherein a release film is formed by condensation reaction of organopolysiloxanes by use of organic metal salt catalysts such as organic tin compounds.

The silicone compositions used in these procedures can yield films by application of heat and are thus of a thermally curable type. Depending on the nature of the composition, these compositions can be classified into a solvent type where the ingredients are dissolved in organic solvents such as toluene, an emulsion type where the ingredients are emulsified, and a solvent-free type which makes use of silicones alone.

From the standpoint of industrial production, the first method wherein the curing speed is significantly higher than the second method has been widely employed. As an organohydrogenpolysiloxane serving as a crosslinking agent in the addition-reactive siloxane composition used in the first method, methylhydrogenpolysiloxane of the following formula (1) wherein m and n are, respectively, a positive value has been widely used

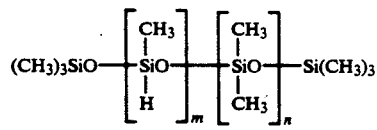

(1)

In order to enhance the curability, there has been proposed, for example, in Japanese Laid-open Patent Application No. 61-235461 an organohydrogenpolysiloxane of the formula, $(R^1SiO_{1.5})_m(R^2_2HSiO_{0.5})_n$, wherein each $R^1$ and each $R^2$ may be the same or different and represent an unsubstituted or substituted monovalent hydrocarbon group except for aliphatic unsaturated hydrocarbon groups and m and n satisfy the relation of $0.1 < n/m < 3$. As will be apparent from the above, the above organohydrogenpolysiloxane is of the type which consists of the trifunctional siloxane units and the monofunctional siloxane units.

Although the curability is enhanced, adhesion to substrates is lowered. This makes it difficult to use the organohydrogenpolysiloxane singly, thus leading to the drawback that this siloxane has to be used in combination with the siloxane of the above-indicated formula.

SUMMARY OF THE INVENTION

It is accordingly an object of the invention to provide a curable organopolysiloxane composition capable of yielding a silicone release composition which has good adhesion to substrates.

It is another object of the invention to provide an energy-saving type curable organopolysiloxane composition which is curable at low temperatures or rapidly.

It is a further object of the invention to provide a cured silicone release composition obtained from the curable organopolysiloxane mentioned above.

The above objects can be achieved, according to the invention, by a curable organopolysiloxane composition which comprises:

(A) an organopolysiloxane having at least two vinyl groups each joined to silicon atoms in one molecule and having a viscosity not lower than 50 centipoises at 25° C.;

(B) an organohydrogenpolysiloxane of the following general formula

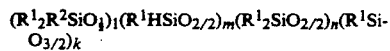

wherein $R^1$'s may be the same or different and represent an unsubstituted or substituted monovalent hydrocarbon group other than aliphatic unsaturated hydrocarbon groups, $R^2$ represents a hydrogen atom or a monovalent hydrocarbon group represented by $R^1$, and l, m, n and k are such that $1+m+n+k$ is a value which permits the organopolysiloxane to have a viscosity at 25° C. of from 5 to 1,000 centipoises and that $m \geq 2$, $k \geq 1$, $0.5 \leq 1/k \leq 3$ and $0 \leq n/m \leq 1$; and (C) a platinum group catalyst.

DETAILED DESCRIPTION AND EMBODIMENTS OF THE INVENTION

The organopolysiloxane used as the ingredient (A) of the invention should have at least two vinyl groups directly joined to silicon atoms in the molecule. The vinyl groups should be preferably contained in an amount of 0.05 to 50 mole %, more preferably from 0.2 to 10 mole %, based on the total organic groups. If the content of the vinyl groups is less than 0.5 mole %, a substantially cured film cannot be obtained. Over 50 mole %, such an organopolysiloxane is difficult to prepare and better physical properties cannot be expected, thus being unfavorable from the industrial viewpoint.

Organic groups other than the vinyl groups, which are joined to the silicon atoms may be the same or different and include unsubstituted or substituted monovalent hydrocarbon groups. Examples of such monovalent hydrocarbon groups include an alkyl group such as a methyl group, an ethyl group, a propyl group or the like, an aryl group such as a phenyl group, a tolyl group or the like, and those groups mentioned above but substituted with a halogen atom or a cyano group at part or whole of the hydrogen atoms joined to the carbon atoms of the groups.

Of these, organopolysiloxanes which have at least 50 mole % of methyl groups contained therein are preferred.

The organopolysiloxane molecule may have a hydroxyl group, an alkyl group or a vinyl group at terminal end or ends thereof. In view of the curability, each terminal group should preferably be a vinyl group.

The organopolysiloxane should have film-forming properties and have thus a viscosity of not lower than 50 centipoises at 25° C. The organopolysiloxane may take an oily to rubbery form.

The organohydrogenpolysiloxane used as the ingredient (B) undergoes hydrosilylation crosslinking reaction with the vinyl groups of the ingredient (A).

For this purpose, this siloxane should have at least two hydrogen atoms joined to the silicon atoms in the molecule. In view of the curability, the ingredient (B) should have at least one trifunctional siloxane unit and should have a viscosity of from 5 to 1,000 centipoises at 25° C.

Such a organohydrogenpolysiloxane is of the following general formula, $(R^1_2R^2SiO_{\frac{1}{2}})_l(R^1HSiO_{2/2})_m(R^1_2SiO_{2/2})_n(R^1SiO_{3/2})_k$ wherein $R^1$'s may be the same or different and represent an unsubstituted or substituted monovalent hydrocarbon group other than aliphatic unsaturated hydrocarbon groups, $R^2$ represents a hydrogen atom or a monovalent hydrocarbon group represented by $R^1$, and l, m, n and k are such that $l+m+n+k$ is a value which permits the organopolysiloxane to have a viscosity at 25° C. of from 5 to 1,000 centipoises and that $m \geq 2$, $k \geq 1$, $0.5 \leq l/k \leq 3$ and $0 \leq n/m \leq 1$ The unsubstituted or substituted monovalent hydrocarbon group represented by $R^1$ should preferably have 1 to 10 carbon atoms and includes, for example, an alkyl group such as a methyl group, an ethyl group, a propyl group or the like, an aryl group such as a phenyl group, tolyl group or the like, or those groups indicated above but substituted with a halogen atom or a cyano group at part or whole of the hydrogen atoms joined to the carbon atoms.

$R^1$ should preferably represent a methyl group from the standpoint of productivity and curability of the ingredient (B). $R^2$ should preferably be a hydrogen atom in view of adhesion to substrates. l, k, n and k are so chosen that the total value of $l+m+n+k$ allows the resultant organohydrogenpolysiloxane to have a viscosity ranging from 5 to 1,000 centipoises, preferably from 10 to 100 centipoises, at 25° C. If the viscosity is less than 5 centipoises, good curability and adhesion cannot be expected. Over 1,000 centipoises, preparation becomes difficult with the pot life and shelf life stabilities being unsatisfactory.

In addition, l, m, n and k should be such that $m \geq 2$, $k \geq 1$, $0.5 \leq l/k \leq 3$, preferably $2 \leq l/k \leq 3$, $0 \leq n/m \leq 1$, preferably $0 \leq n/m \leq 0.5$. This is because when $0.5 > l/k$, the resultant product becomes too viscous with the possibility that gelation takes place. If $n/m > 1$, adhesion is undesirably lowered.

Typical and most preferable examples of the ingredient (B) include those which are set out in Synthetic Examples 1 to 3. More particularly, these compounds of the following formulas

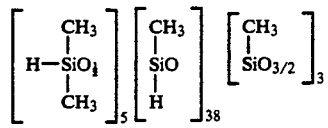

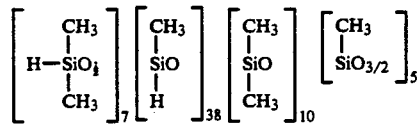

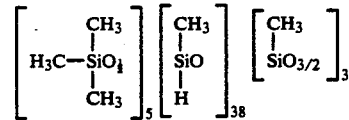

The amount of the ingredient (B) varies depending on the amount of the vinyl groups contained in the ingredient (A). From the aspect of cured film properties and release properties, it is general to add 0.5 to 20 parts by weight, preferably from 1 to 10 parts by weight, of the ingredient (B) per 100 parts by weight of the ingredient (A).

In order to facilitate the addition reaction between the ingredients (A) and (B), platinum group metal catalysts are used in the practice of the invention.

Such catalysts are known in the art and include, for example, platinum catalysts, palladium catalysts and rhodium catalysts. Of these, the platinum catalysts are preferred. Specific examples include chloroplatinic acid, an alcohol or aldehyde solution of chloroplatinic acid, complexes of chloroplatinic acid and various olefins or vinyl siloxanes, and the like.

These platinum group metal catalysts are used in catalytic amounts. In order to obtain a cured film with good properties and to avoid economical waste, it is preferred that the amount of the catalyst, calculated as the platinum group metal, is in the range of from 1 to 1000 ppm based on the ingredient (A).

The composition of the invention is simply obtained by formulating predetermined amounts of the respective ingredients (A) to (C). Aside from these essential ingredients, there may be added other additives such as, for example, retarders for the platinum group metal catalysts. Examples of such retarders include various organic nitrogen compounds, organic phosphorus compounds, acetylene compounds, oxime compounds, organic chloro compounds and the like.

For the preparation of the composition of the invention, it is preferred to uniformly mix the ingredients other than the ingredient (C), after which the ingredient (C) is added. The respective ingredients may be used singly or in combination.

If necessary, the composition of the invention may be used after dissolution in organic solvents such as toluene, xylene, n-hexane and the like.

The thus prepared silicone composition can be applied on substrates such as paper sheets, plastic films or the like and thermally cured by a usual manner. The composition may be cured at a temperature of 80° to 180° C. although depending on the type of substrate material, the content of the catalyst and the like. The substrate on which the cured film of the composition has been formed can be provided as a release sheet.

The silicone composition of the invention makes use of highly curable hydrogenpolysiloxanes as a crosslinking agent. The composition exhibits not only good low temperature curability, but also improved adhesion to substrates by proper selection of the hydrogenpolysiloxane.

This permits the thermally curing energy to be reduced and thus, the composition has utility as energy-saving release paper. Especially, the composition is more effective on application to less heat-resistant substrates such as plastic films.

The invention is more particularly described by way of examples, which should not be construed as limiting the invention thereto. In examples, parts are by weight and viscosities are ones which are determined at 25° C. unless otherwise indicated.

The silicone compositions were subjected to measurements of curing rate, adhesion, peel force, residual adhesion rate, and silicone migration according to the following procedures.

Curing Rate

A silicone composition was applied onto the surface of a thin film or sheet substrate in a predetermined amount, followed by heating in a hot air dryer at a predetermined temperature for a predetermined time. The resultant cured film was rubbed with the tip of a finger several times to measure a time before the film was in a smear-free condition.

Adhesion

A silicone composition was applied onto the surface of a thin film or sheet substrate in a predetermined amount, followed by heating in a hot air dryer at a predetermined temperature for a predetermined time. The resultant film was rubbed with the tip of a finger immediately after the curing and after standing at 25° C. for 3 days to evaluate the presence or absence of the film being rubbed off. Evaluation was made as good for no portion of the film being rubbed off, as moderate for a slight degree of the rubbing off, and as bad for a significant degree of the rubbing off.

Peel Force

A silicone composition was applied onto the surface of a thin film or sheet substrate in a predetermined amount, followed by heating in a hot air dryer at a predetermined temperature for a predetermined time. Subsequently, an acrylic resin-based solvent-type self-adhesive (Oribain BPS-5127, available from Toyo Inks Mfg. Co., Ltd.) was applied onto the cured film surface in an amount of 30 g/m² as the solid matter and thermally treated at 100° C. for 3 minutes.

Then, a wood-free paper sheet with a basis weight of 64 g/m² was set on and bonded to the thus treated surface to provide a sample. The sample was cut into pieces with 5 cm in width. After aging at 25° C. for 20 hours, the sample pieces were subjected to a tensile strength tester under conditions of an peeling angle of 180° C. and a peel rate of 0.3 m/minute thereby determining a force necessary for the peeling.

Residual Adhesion Rate

Like the measurement of the peel force, a polyester tape (Lumilar 31B, Nitto Denko K. K.) was attached to the cured film surface of a silicone composition formed on a substrate surface. The attached sample was applied with a load of 20 g/cm² and aged by application of heat at 70° C. for 20 hours. The cured film-bearing tape was peeled off and attached to a stainless steel sheet. The tape was peeled off from the stainless steel sheet at an angle of 180° at a peel rate of 0.3 m/minute to determine a force (g) necessary for the peeling as Force 1.

Similarly, the cured film was attached to a teflon sheet in place of the polyester tape and aged under the same conditions as indicated above, followed by attachment to a stainless steel sheet to measure a force (g) necessary for the peeling as Force 2.

The ratio by percent of Force 1 to Force 2 is provided as a residual adhesion rate.

Silicone Migration

In the same manner as in the measurement of the peeling force, a silicone composition was formed on a substrate surface and cured, followed by attachment of a 25 μm thick polyethylene terephthalate (PET) film to the cured film surface and application of a load of 10 kg/cm² at 25° C. for 60 minutes. After the application of the load, the side of the PET film which was contacted with the cured silicone film was applied with an oily marking ink to evaluate the migration of the silicone by visual observation of repellence of the ink.

SYNTHETIC EXAMPLE 1

A mixture of 26.8 g of 1,1,3,3-tetramethyldisiloxane, 47.5 g of methyltrimethoxysilane and 182.4 g of 1,3,5,7-tetramethylcyclotetrasiloxane was cooled to 5° C. While agitating, 13.1 g of concentrated sulfuric acid was gently added to the mixture, followed by dropping 4.3 g of water in one hour, whereupon the temperature was raised to 10° C.

While keeping the temperature at 10° C. to 20° C., the agitation was continued for 8 hours, followed by addition of toluene. Thereafter, the siloxane phase was washed with water to separate the wasted acid therefrom until it became neutral. The neutralized siloxane phase was heated and concentrated under reduced pressure to remove low boiling fractions such as toluene, thereby obtaining 171 g of organohydrogenpolysiloxane of the following average compositional formula (2) which had a viscosity of 20.2 centipoises. This siloxane is hereinafter referred to as H-siloxane I)

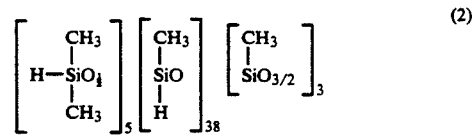

(2)

SYNTHETIC EXAMPLE 2

The general procedure of Synthetic Example 1 was repeated using 21.3 g of 1,1,3,3-tetramethyldisiloxane, 44.6 g of methyltrimethoxysilane and 102.6 g of 1,3,5,7-tetramethylcyclotetrasiloxane, thereby obtaining 145 g of organohydrogenpolysiloxane of the following average compositional formula (3) having a viscosity of 17.2 centipoises (hereinafter referred to as H-siloxane II).

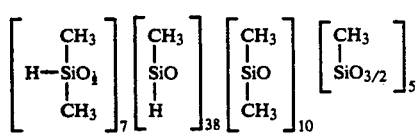

(3)

SYNTHETIC EXAMPLE 3

The general procedure of Synthetic Example 1 was repeated using 32.4 g of hexamethyldisiloxane, 47.5 g of methyltrimethoxysilane and 182.4 g of 1,3,5,7-tetramethylcyclotetrasiloxane, thereby obtaining 194 g of organohydrogenpolysiloxane of the following average compositional formula (4) having a viscosity of 23.5 centipoises (hereinafter referred to as H-siloxane III).

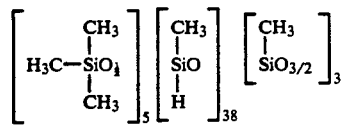

(4)

EXAMPLES 1 TO 3

30 parts of dimethylpolysiloxane, used as the ingredient (A), which was terminated with a dimethylvinylsiloxy group at both ends thereof, which had 1.5 mole % of methylvinylsiloxane units and which had a viscosity of 5,000 centipoises in the form of a 30 wt % toluene solution were mixed with each of H-siloxanes I to III, as the ingredient (B), obtained in Synthetic Examples 1 to 3 in an amount corresponding to a ratio of the ≡Si—CH=CH$_2$ group to the Si≡H group of 1:2.

Further, 1 part of a silicon compound of the following formula (5) having an acetylenically unsaturated bond was added as a retarder for platinum group catalysts, followed by uniform dissolution in toluene to make 30 wt % of the effective ingredients.

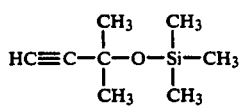

(5)

A complex of platinum and vinyl siloxane used as the ingredient (C) was added to the resultant solution in an amount of 200 ppm calculated as platinum to provide silicone compositions (1) to (3).

COMPARATIVE EXAMPLES 1 TO 3

The general procedures of Examples 1 to 3 were repeated except that there were, respectively, used, in place of the ingredients (B) of Examples 1 to 3, a siloxane compound of the average compositional formula (6) (hereinafter referred to as H-siloxane IV), a mixture of siloxane compounds of the average compositional formulas (6) and (7) at a ratio by weight of 1:1 (hereinafter referred to as H-siloxane V), and a siloxane compound of the average compositional formula (8) (hereinafter referred to as H-siloxane VI), thereby obtaining silicone compositions (4) to (6).

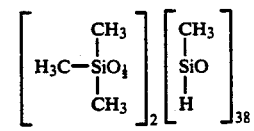

(6)

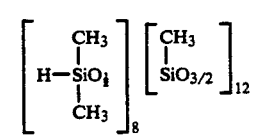

(7)

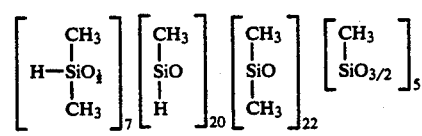

(8)

The silicone compositions 1 to 6 were each applied onto a polyethylene laminated paper sheet in an amount of 0.6 g/m$^2$. The curability and adhesion were measured after curing at 100° C. and the other properties were measured after curing at 140° C. for 30 seconds.

The results are shown in the following Tables 1 and 2.

TABLE 1

| Silicone Composition | Type and Amount of H-siloxane (parts) | | Curability 100° C. | Adhesion Cured at 100° C. × 10 seconds | |
|---|---|---|---|---|---|
| | | | | Immediately After Curing Treatment | After 3 days |
| Example: | | | | | |
| 1 | (1) | I 0.90 | 15 seconds | non-cured | good |
| 2 | (2) | II 1.03 | 15 seconds | non-cured | good |
| 3 | (3) | III 0.92 | 15 seconds | non-cured | moderate to good |
| Comparative Example: | | | | | |
| 1 | (4) | IV 0.77 | 20 seconds | non-cured | moderate |
| 2 | (5) | V 1.15 | 15 seconds | non-cured | bad |
| 3 | (6) | VI 1.64 | 10 seconds | bad | bad |

TABLE 2

| | Adhesion Cured at 100° C. × 20 seconds | | Peel Force (g/5 cm) | Residual Adhesion Rate (%) | Migration (Repellence of Oily Marking Ink) |
|---|---|---|---|---|---|
| | Immediately After Curing Treatment | After 3 days | | | |
| Example: | | | | | |
| 1 | good | good | 120 | 99 | no |
| 2 | good | good | 125 | 102 | no |
| 3 | good | good | 130 | 100 | no |
| Comparative Example: | | | | | |
| 1 | good | good | 120 | 103 | no |
| 2 | good | moderate | 110 | 100 | no |
| 3 | moderate | bad | 125 | 105 | no |

As will be apparent from the above results, the curability of the compositions of the invention is good with good adhesion to the substrate.

What is claimed is:

1. A curable organopolysiloxane composition which comprises:
  (A) 100 parts by weight of an organopolysiloxane having at least two vinyl groups each joined to silicon atoms in one molecule and having a viscosity not lower than 50 centipoises at 25° C.;

(B) from 0.5 to 20 parts by weight of an organohydrogenpolysiloxane of the following general formula

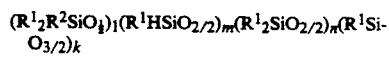

wherein $R^1$'s may be the same or different and represent an unsubstituted or substituted monovalent hydrocarbon group other than aliphatic unsaturated hydrocarbon groups, $R^2$ represents a hydrogen atom or a monovalent hydrocarbon group represented by $R^1$, and l, m, n and k are such that $l+m+n+k$ is a value which permits the organopolysiloxane to have a viscosity at 25° C. of from 5 to 1,000 centipoises and that $m \geq 2$, $k \geq 1$, $0.5 \leq l/k \leq 3$ and $0 \leq n/m \leq 1$; and (C) a catalytic amount of a platinum group catalyst.

2. The composition according to claim 1, wherein said at least two vinyl groups are contained in an amount of from 0.05 to 50 mole % based on the total of organic groups in the molecule.

3. The composition according to claim 1, wherein said organopolysiloxane (A) contains at least 50 mole % of a methyl group based on the total of organic groups in the molecule.

4. The composition according to claim 1, wherein each $R^1$ represents a methyl group and $R^2$ represents a hydrogen atom.

5. The composition according to claim 1, wherein the amount of the ingredient (B) is in the range of from 1 to 10 parts by weight.

6. The composition according to claim 1, wherein said ingredient (B) is a compound of the following average compositional formula

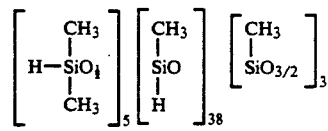

7. The composition according to claim 1, wherein said ingredient (B) is a compound of the following average compositional formula

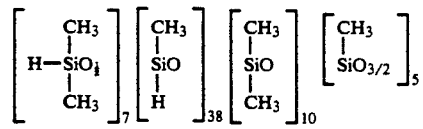

8. The composition according to claim 1, wherein said ingredient (B) is a compound of the following average compositional formula

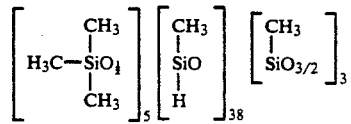

9. A cured product of the composition defined in claim 1.

* * * * *